US006771772B1

(12) United States Patent
Tanrikulu

(10) Patent No.: US 6,771,772 B1
(45) Date of Patent: Aug. 3, 2004

(54) METHOD AND APPARATUS FOR FAST NETWORK BULK DELAY AND SPAN ESTIMATION FOR LINE ECHO CANCELLATION

(76) Inventor: Oguz Tanrikulu, 164 Hosmer St. - Apt. 10, Marlboro, MA (US) 01752

( * ) Notice: Subject to any disclaimer, the term of this patent is extended or adjusted under 35 U.S.C. 154(b) by 0 days.

(21) Appl. No.: 09/350,497

(22) Filed: Jul. 9, 1999

(51) Int. Cl.[7] .......................... H04M 1/00; H04M 9/00; H04M 9/08
(52) U.S. Cl. ............................ 379/406.14; 379/406.01; 379/406.05; 379/406.08
(58) Field of Search ....................... 379/387.01–392.01, 379/395, 395.01, 406.01–406.16

(56) References Cited

U.S. PATENT DOCUMENTS

| | | | |
|---|---|---|---|
| 5,553,014 A | * | 9/1996 | De Leon, II et al. |
| 5,598,468 A | | 1/1997 | Ammicht et al. |
| 5,721,782 A | | 2/1998 | Piket et al. |
| 5,828,589 A | | 10/1998 | Degenhardt |

FOREIGN PATENT DOCUMENTS

| | | |
|---|---|---|
| EP | 0 708 535 A1 | 4/1996 |
| EP | 0 821 513 A1 | 1/1998 |

OTHER PUBLICATIONS

Fan et al, Noise Cancellation in Sub–Bands Using the Conjugate Gradient Method, 1995, IEEE, 1058–6393/95, pp. 607–611.*
ITU Recommendation G.165—Echo Cancellers, Mar. 1993.
S. Haykin;"Adaptive Filter Theory," Prentice–Hall, 3rd Edition, 1996.
O. Tanrikulu,et al., "Residual Echo Signal in Critically Sampled Subband Acoustic Echo Cancellers based on IIR and FIR filter banks," IEEE Trans. Sig. Proc. vol. 45,No. 4, pp. 901–912, Apr. 1997.
O. Tanrikulu, et al.; "Cascaded Power Symmetric IIR Filter Banks in Subband Adaptive Filtering with Application to Acoustic Echo Cancellation", IEEE. Trnas. Sig. Proc., vol. 46, No. 8, pp. 2220–2225, Aug. 1988.
P.P. Vaidyanathan; Multirate Systems and Filter Banks, Prentice–hall 1993.
O. Tanrikulu, et al.; "Design and Discrete Re–optimization of All–pass Based Power Symmetric IIR Filters," Electronics Letters, vol. 32, No. 16, pp. 1458–1460, 1996.
P.A. Naylor, et al.; "Subband Acoustic Echo Control Using Non–critical Frequency Sampling", Proc. of EUSIPCO–96, vol. 2, Trieste, Italy, 1996.

* cited by examiner

Primary Examiner—Duc Nguyen
(74) Attorney, Agent, or Firm—Hamilton, Brook, Smith & Reynolds, P.C.

(57) ABSTRACT

The present invention is a method and apparatus for estimating the bulk delay and span associated with an echo signal on a telephone line carrying a proximal signal and an echo signal. A baseline solution is to use the echo canceller itself to estimate the bulk-delay. After achieving a reasonable level of echo cancellation, the bulk-delay and the echo-span are estimated from the adaptive coefficients, followed by an enhanced mode of operation using the estimated parameters. Alternatively, for longer, unknown bulk delays, a subband adaptive system is used to estimate the bulk-delay and echo-span. The subband adaptive echo canceller outputs the set of subband adaptive coefficients to a full-band echo canceller after achieving a reasonable level of convergence.

47 Claims, 12 Drawing Sheets

METHOD AND APPARATUS FOR FAST NETWORK BULK DELAY AND SPAN ESTIMATION FOR LINE ECHO CANCELLATION

BACKGROUND OF THE INVENTION

In the field of telephone communication, there are echoes of electrical origin. The echo is generally the result of an impedance mismatch at various 2-wire or 4-wire junctions of tandem links forming a telephone connection, or an imperfect decoupling between the 4-wire receive and send ports of 2-to-4-wire junctions, defining thereby the balancing attenuation, or these two phenomena combined. The trouble caused by an echo becomes more important as the echo level is higher and its delay is longer.

FIG. 6 shows schematically an environment in which telephone network echoes arise, and in which the present invention is deployed. A signal is transmitted from "office #1" 610 to "office #2" 640 via telephone lines spanning between them. "Office #1" 610 transmits signals over a 2-wire link 615 to "central office #1" 620. "Office #2" 640 communicates via a 2-wire link 635 to "central office #2" 630. "Central office #1" 620 communicates via a 4-wire link 625 to "central office #2" 630. The 4-wire link 625 has a pair of transmit lines 623 and a pair of receive lines 627.

"Central office #1" 620 has a 2-to-4-wire junction 625a, and "central office #2" 630 has a 2-to-4-wire junction 625b. Again, impedance mismatch or imperfect decoupling in the system between "office #1" 610 and "office #2" 640 creates echoes.

To obviate the electrical echo in circuits having a long propagation time, two types of equipment are the subject of CCITT Recommendations: the echo suppressors dealt with in Recommendation G. 164, CCITT Yellow Book edition 1981, vol. III. 1, p. 154 ff., and the echo cancellers or compensators described in Recommendation G.165, CCITT Yellow Book edition 1981, vol. III.1, p. 182 ff. The echo cancellers constitute an improvement with respect to echo suppressors because the echo cancellers act less abruptly and, for example, in the case of a speech signal, they render it possible to reduce the level of the echo signal at the receiving end, while retaining the far-end speech information signal at its normal level.

There are several techniques that can be used to remove network echoes that arise from unbalanced near-end and far-end hybrids. A baseline solution for a cancellation of these echoes involves the combined use of adaptive filtering, non-linear processing of the residual echo, and double-talk detection. See *"ITU Recommendation"*, G.165 cancellers, March, 1993.

The echo path is usually modeled as a finite impulse response (FIR) system having a time-span (of up to 32 msec) and a bulk delay, which is due to the switching equipment and the internal processing delay of the system. If the bulk delay is unknown, then the time-span of the adaptive filter used for echo cancellation must cover both the bulk delay and the echo-span.

SUMMARY OF THE INVENTION

The problem with the combined use of adaptive filtering, non-linear processing, and double-talk detection is that the computational complexity associated with such an implementation is beyond desirable practical limits where the bulk delay is unknown. Also, the set of adaptive coefficients corresponding to delays less than the bulk-delay decreases the signal-to-noise ratio (SNR) at the echo canceller output due to what is known as a gradient noise associated with a gradient-based adaptive method. See S. Haykin, *"Adaptive Filter Theory"*, Prentice-Hall, 3rd Edition, 1996. Finally, convergence is much slower due to a higher number of adaptive taps in such a system.

The present invention is generally directed to an echo canceller having the precise estimate of the bulk-delay and a sufficient number of adaptive coefficients to model the echo path. A baseline solution of the present invention is to use the echo canceller itself to estimate the bulk-delay. After achieving a reasonable level of echo cancellation, the bulk-delay and the echo-span are estimated from the adaptive coefficients, followed by an enhanced mode of operation using the estimated parameters. In the alternative, for longer bulk delays, another embodiment of the present invention uses a subband adaptive system to estimate the bulk-delay and echo-span.

According to one aspect of the present invention, in an echo canceller in a telephone line, an estimator apparatus is used for estimating an echo signal on a telephone line carrying a proximal (sometimes known as a "near-end" signal) signal and an echo signal. The estimator apparatus has a subband adaptive echo canceller that has a set of subband adaptive coefficients. The subband adaptive echo canceller reports the set of subband adaptive coefficients after achieving a reasonable level of convergence.

In one embodiment of the present invention apparatus, the subband adaptive echo canceller comprises a set of subband decomposition filters and a set of adaptive filters. The set of subband decomposition filters decompose a proximal signal and an echo signal into corresponding sets of subband proximal and echo signals. The set of adaptive filters receive the sets of subband proximal and echo signals and adjusts the set of subband adaptive coefficients in response thereto. In the preferred embodiment, the decomposition filters are power-symmetric, infinite impulse response filter banks, and the subband adaptive filters comprise a normalized least mean-square adaptive filter to update the adaptive taps. In another embodiment, other subband processing methods can be used along with other adaptive algorithms. However, other subband decomposition techniques involving finite impulse response filters or wavelets or any other transform-domain approaches can be used.

The estimator apparatus further comprises an estimator receiving the set of subband adaptive coefficients and determines the echo signal bulk-delay as a function of the subband adaptive coefficients. The estimator has a gradient noise reducing unit. The estimator also has an echo path impulse response peak detector to locate the peak of the echo path impulse response. Furthermore, the estimator comprises a peak-to-average ratio measuring unit, a peak-to-average ratio threshold detector, and an echo-span calculation unit. In one embodiment, the echo-span calculation unit allocates more coefficients to the echo tail than to the echo signal preceding the peak delay. In the preferred embodiment, the echo-span calculation unit performs averaging around the bulk-delay peak in order to calculate the optimal number of coefficients to be used.

According to another aspect of the present invention, an echo canceller in a telephone line performs a method for canceling an undesired echo path impulse response having a bulk-delay, peak delay, echo-span, and echo tail in a telephone network carrying a proximal signal and an echo signal. The method comprises the steps of determining a set of adaptive coefficients as a function of the proximal signal and the echo signal and reporting the adaptive coefficients. The present invention method further comprises the steps of calculating the bulk-delay as a function of the adaptive coefficients and reporting the bulk-delay. Furthermore, the present invention method comprises the steps of calculating the echo-span as a function of the adaptive coefficients and reporting the echo-span.

The step of determining the adaptive coefficients in the present invention method comprises the steps of subdividing the proximal signal and the echo signal into sets of subbands, and processing the subdivided proximal signal and the subdivided echo signal, thereby determining the adaptive coefficients. The step of subdividing the proximal signal and the echo signal includes the step of using polyphase power-symmetric infinite impulse response filter banks. The step of processing comprises the step of subband adaptive filtering, which comprises the step of minimizing the normalized least mean-square of the echo signals in each subband.

The step of calculating the bulk-delay includes the step of reducing gradient noise while enhancing the response around the echo path impulse response. The step of reducing gradient noise while enhancing the response around the echo path impulse response includes the step of averaging a function of the subband adaptive filter coefficients, which are averaged across the subbands. Calculating the bulk-delay further includes the step of detecting the echo path impulse response peak delay, where detecting the delay associated with the peak of the echo path impulse response comprises the steps of: (1) calculating a peak to average ratio, and (2) determining whether the peak to average ratio exceeds a predetermined peak to average ratio threshold.

The step of calculating the echo span comprises the step of allocating more adaptive coefficients for the echo tail than adaptive coefficients preceding the peak delay, in one embodiment of the present invention method. In the preferred embodiment, the present invention method step of calculating the echo span comprises the steps of (1) averaging the echo span around the estimated peak delay, and (2) choosing the echo span according to a predetermined optimality criterion.

BRIEF DESCRIPTION OF THE DRAWINGS

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

In the drawings, like reference characters refer to the same parts throughout the different views. The drawings are not necessarily to scale, emphasis instead being placed upon illustrating principles of the invention.

DETAILED DESCRIPTION OF THE PREFERRED EMBODIMENT

Figure 1A:
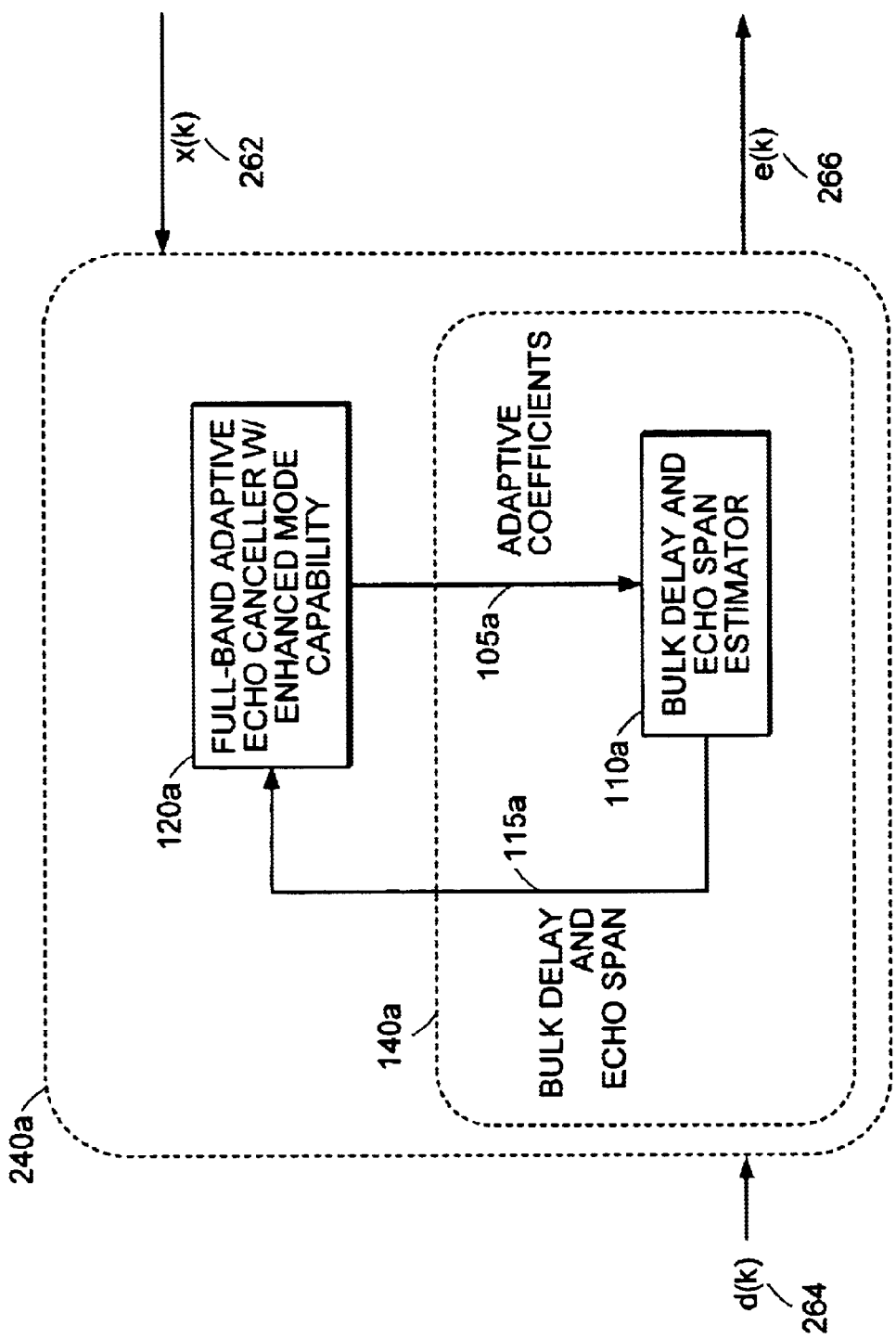
FIG. 1A is a block diagram showing an embodiment of the present invention.

FIG. 1A illustrates an embodiment of a baseline solution of the present invention using a full-band echo canceller to estimate a bulk-delay and an echo span. After achieving a reasonable echo cancellation, the bulk-delay and the echo span are estimated from a set of subband echo canceller adaptive coefficients. This is followed by the full-band echo canceller operating in an enhanced mode of operation using the estimated parameters.

The baseline solution echo canceller system 240a comprises a baseline solution subsystem 140a. The baseline solution echo canceller system 240a comprises a full-band adaptive echo canceller with enhanced mode capability 120a, and the baseline solution subsystem 140a comprises an echo estimator 110a. Furthermore, the baseline solution echo canceller 240a receives a near-end signal x(k) 262 and an echo signal d(k) 264. The baseline solution echo canceller system 240a transmits an error signal e(k) 266.

The input/output (I/O) signals, x(k) 262, d(k) 264, e(k) 266, are electrically coupled into the baseline solution echo canceller system 240a. The near-end signal x(k) 262 is an electrical signal transmitted from a near-end electronic communication device. Typical communication devices are a telephone, computer modem, or other electrical device capable of transmitting electrical signals through communication signal mediums to another electronic communication device. The echo signal d(k) 264 is the result of an impedance mismatch or an imperfect decoupling, as discussed in the background. The error signal e(k) 266 is a residual error of the echo signal d(k) 264 that was not canceled by the baseline solution echo canceller system 240a.

The full-band adaptive echo canceller with enhanced mode capability 120a calculates a set of adaptive coefficients, inherent in an adaptive echo canceller, and an adaptive coefficient transmission 105a transmits the adaptive coefficients to the bulk delay and echo span (echo) estimator 110a.

The echo estimator 110a calculates the bulk-delay and echo span from the received full-band adaptive coefficients using standard adaptive estimation methods, and a bulk-delay and echo span transmission 115a sends the bulk-delay and echo span results to the full-band adaptive echo canceller having advanced mode capability 120a.

The full-band adaptive echo canceller with enhanced mode capability 120a has equally spaced adaptive coefficients. The enhanced mode allows for more adaptive coefficients around an echo path impulse response bulk-delay peak within the echo span. A result of the enhanced mode is a reduction in residual error e(k) 266.

For relatively large bulk-delays such as 100 msec, the computational complexity of the baseline solution is around 20 MIPS on a common TMS320 C5x processor, and the convergence is noticeably slow. Hence, in order to lower the computational complexity while extracting the same features with high accuracy, another embodiment is preferred over the embodiment of FIG. 1A. That is, this baseline solution (FIG. 1A) is not a general solution and, hence, not the preferred embodiment.

Figure 1B:
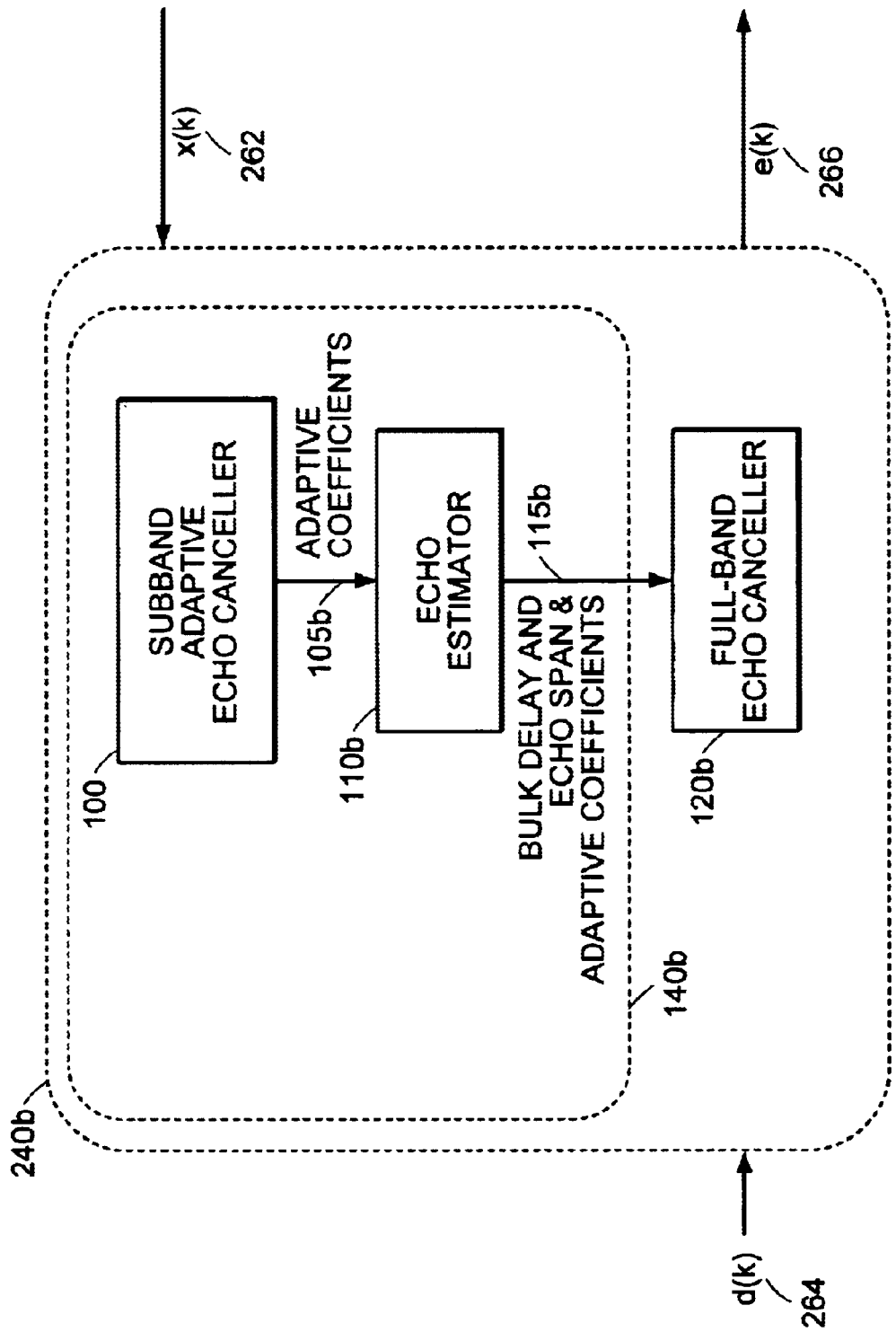
FIG. 1B is a block diagram of the preferred embodiment of the present invention.

FIG. 1B shows the preferred embodiment of the present invention apparatus. A subband adaptive echo canceller apparatus 140b estimates the bulk-delay and echo span. Bringing a subband adaptive structure into this problem has desirable properties. First, the computational complexity is reduced proportional to the number of subbands, represented as "B" in equations below. Second, a subband structure converges considerably faster than the full-band adaptive filter, due to a reduced eigenvalue spread of the subband signals. Third, the coefficients of the subband adaptive filters, after convergence, are used to estimate the bulk delay and echo span, and even initialize the full-band echo canceller 120b.

The preferred embodiment echo canceller apparatus 240b comprises a subband adaptive echo canceller apparatus 140b. The subband adaptive echo canceller apparatus 140b employs a subband adaptive echo canceller 100. Like the baseline solution embodiment of FIG. 1A, the embodiment depicted in FIG. 1B comprises an echo estimator 110b that feeds an impulse response bulk delay and echo span to a full-band echo canceller 120b. Furthermore, an adaptive coefficients transfer 105b sends a set of subband adaptive echo canceller adaptive coefficients to the echo estimator 110b from the subband adaptive echo canceller 100. Also, a bulk-delay and echo span transfer 115b transmits a set of results from the echo estimator 110b to the full-band echo canceller 120b.

The subband adaptive echo canceller 100 receives x(k) 262 and d(k) 264. The subband adaptive echo canceller 100 pre-subdivides the near-end signal 262 and the echo signal 264 into sets of subbands. Working the echo cancellation process in a parallel fashion to reduce a calculation time from that of a full-band echo canceller, then initializing the full-band echo canceller 120b, achieves a faster convergence of the full-band echo canceller 120b.

In turn, the adaptive coefficients transmission 105b transmits subband sets of adaptive coefficients from the subband adaptive echo canceller 100 to the echo estimator 110b. The echo estimator 110b, after receiving the adaptive coefficients transmission 105b, calculates a bulk-delay. In the preferred embodiment of the present invention, the echo estimator 110b further calculates the echo span.

The bulk-delay and echo span transmission 115b transfers a bulk-delay from the echo estimator 110b to the full-band echo canceller 120b. In another embodiment, the bulk-delay and echo span transmission 115b further transmits the echo span to the full-band echo canceller 120b. In the preferred embodiment, the bulk-delay and echo span transmission 115b further transmits a set of adaptive coefficients to the full-band echo canceller 120b.

In one embodiment of the present invention, the full-band echo canceller 120b receives the bulk-delay and echo span from the subband adaptive echo canceller apparatus 140b. In the preferred embodiment, the full-band echo canceller 120b further receives adaptive coefficients for initialization purposes. Thereafter, the full-band echo canceller 120b receives the near-end signal 262 and the echo signal 264. The full-band echo canceller 120b calculates the error signal 266 during full-band echo cancellation operations, which occurs after initialization and until a communication activity (for which the echo cancellation is achieved) is terminated.

Figure 1C:
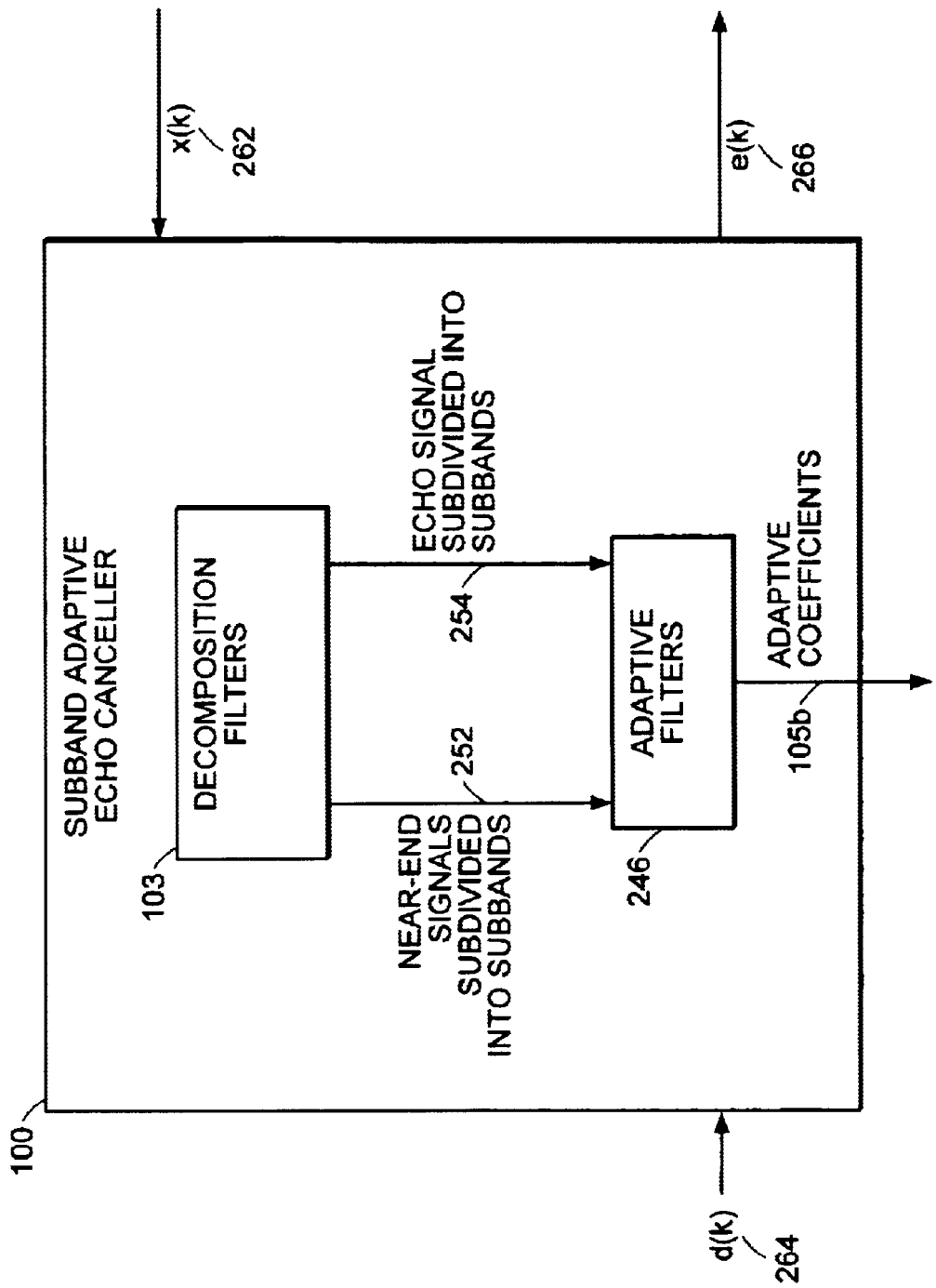
FIG. 1C is a block diagram of an embodiment of the subband adaptive echo canceller shown in FIG. 1B.

FIG. 1C shows an embodiment of the subband adaptive echo canceller 100 of FIG. 1B. The subband adaptive echo canceller 100 receives the near-end signal 262 and the echo signal 264 and outputs the residual error signal 266. The subband adaptive echo canceller 100 comprises decomposition filters 103 and subband adaptive filters 246. The subband adaptive echo canceller 100 further comprises a subband near-end signal transmission 252 and a subband echo signal transmission 254. Each of these transmissions 252, 254 transmit respective signals from the decomposition filters 103 to the adaptive filters 246. In response, the subband adaptive filters 246 determine a set of adaptive coefficients, and the adaptive coefficients are output to other modules via the adaptive coefficient transmission 105b.

The decomposition filters 103 separate a full-band signal into a set of signal subbands. Here, the near-end signal 262 and echo signal 264 are decomposed into a set of frequency subbands, wherein the decomposition filters 103 limit the amount of signal phase shift they impose on the signals being decomposed. In the preferred embodiment of the present invention apparatus, PS-IIR (power symmetric infinite impulse response) filters provide a decomposition means. In an alternate embodiment, other decomposition filter types, such as FIR filters approximating a PS-IIR filter, is used rather than a PS-IIR filter.

The adaptive coefficients transmission 105b supports sets of subband adaptive coefficients. Adaptive coefficients are transmitted from the subband adaptive echo canceller 100 to the full-band echo canceller 110, or other module requesting the adaptive coefficients, such as the echo estimator 110b (FIG. 1B).

Figure 3A:
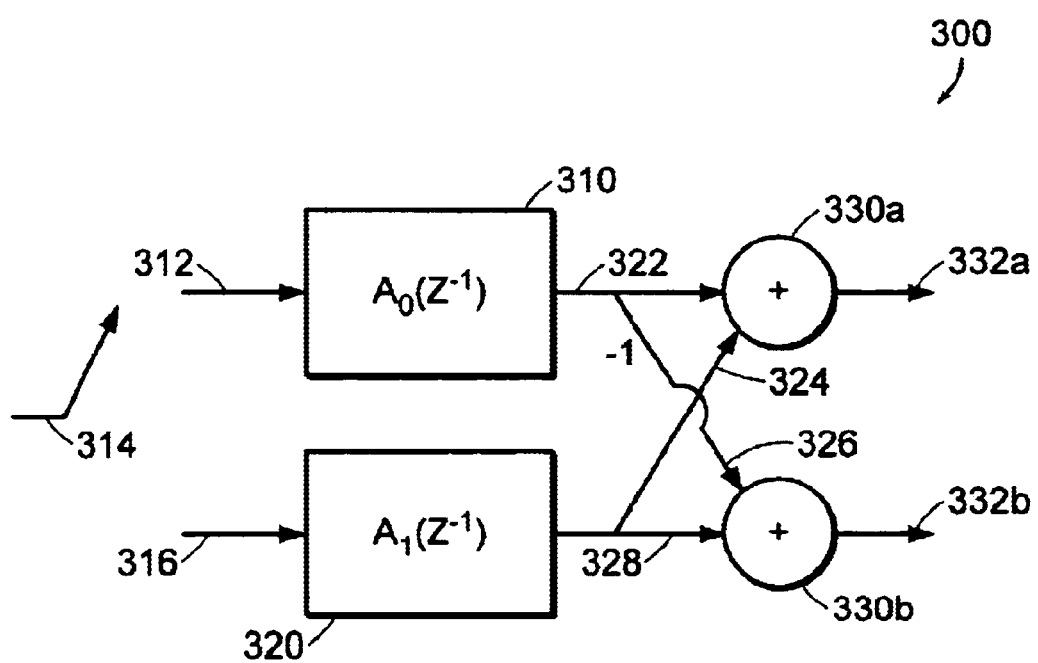
FIG. 3A is a block diagram of the preferred embodiment of a polyphase analysis bank filter depicted in FIG. 2A.
Figure 3B:
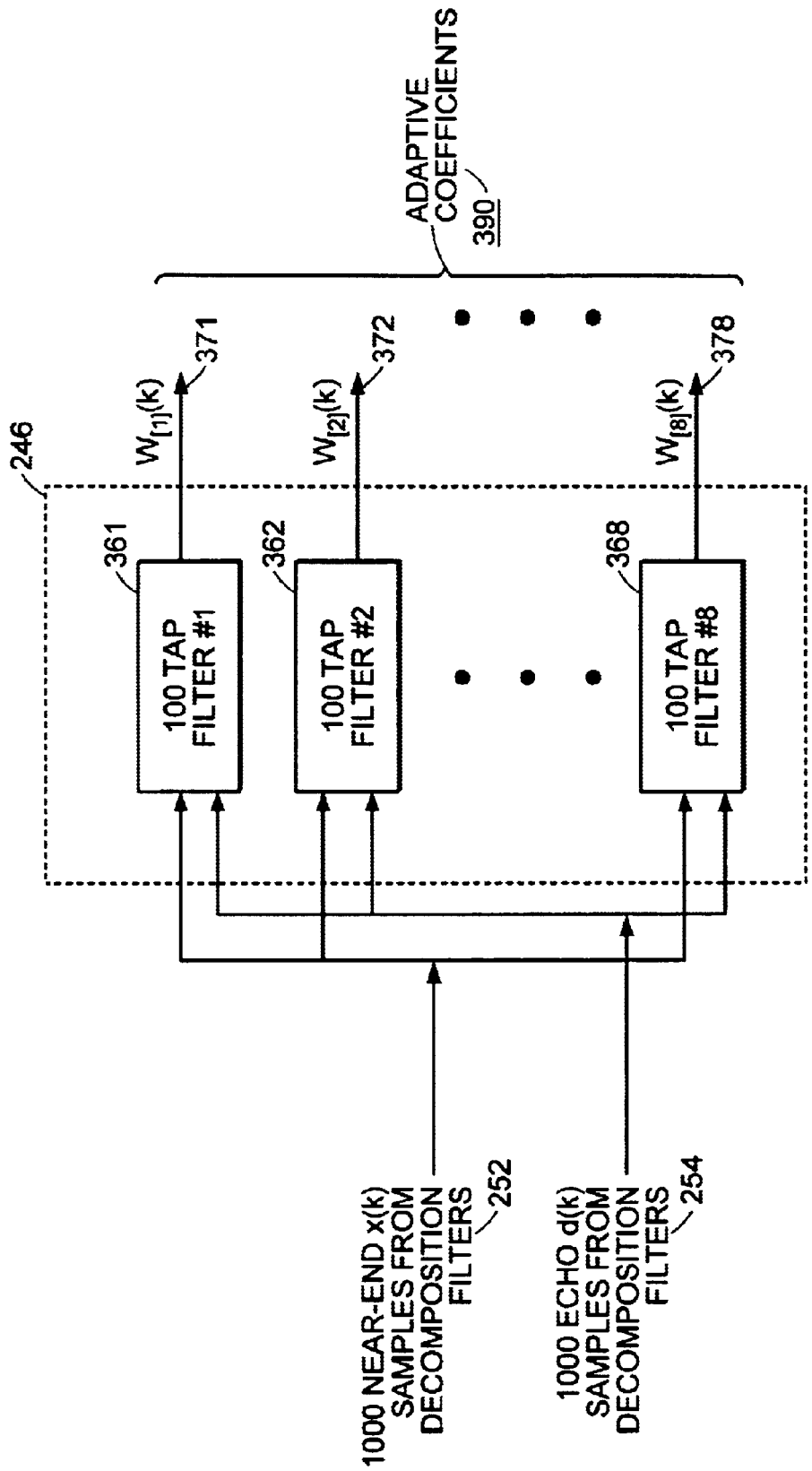
FIG. 3B is a structural diagram of an embodiment of the adaptive filters shown in FIG. 2A having eight, one hundred tap filters.

FIG. 3B illustrates an embodiment of the subband adaptive filters 246. The subband adaptive filters 246 receive a set of near-end signals 252 and a set of echo signals 254. The parallel running subband adaptive filters 246 process the sets of subband signals 252, 254 and output a set of adaptive coefficients 390.

In the embodiment shown, the parallel running adaptive filter 246 includes eight, 100 tap filters 361, 362, ..., 368. Each 100 tap filter 361, 362, ..., 368 receives a near-end signal 252 and an echo signal 254. After performing an adaptive computation on a frame of data signals 252, 254, the 100 tap filters 361, 362, ..., 368 output adaptive coefficients 390, shown as $W_{[i]}(k)$ 371, 372, ..., 378, where [i]=1, 2, ..., 8. Note that the present invention is scalable, allowing for greater or fewer filters having greater or fewer filter taps.

Figure 2A:
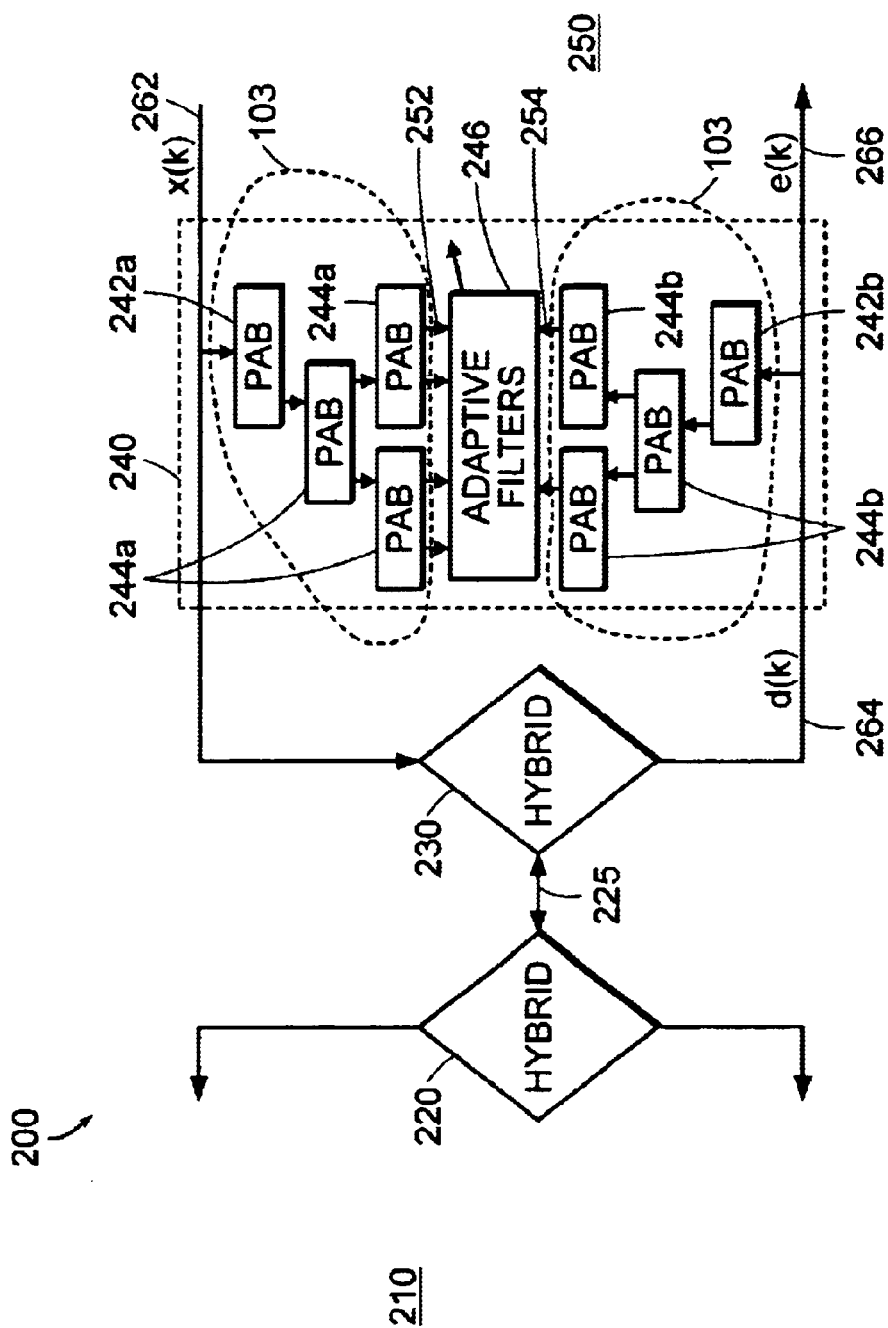
FIG. 2A is a structural diagram of the preferred embodiment of the present invention of FIG. 1B.

FIG. 2A shows a subband adaptive structure used to estimate a network echo bulk delay in a typical operation environment 200. A set of decomposition filters 103 receives a near-end signal 262 and an echo signal 264. A number of layers of decomposition filters 103 indicates a number of subbands into which the near-end signal 262 and the echo signal 264 are separated. The subband adaptive filters 246 receive the sets of subbands 252, 254.

A near-end (proximal) environment 250 has an electronic communication device that transmits to a far-end (distal) environment 210, also having an electronic communication device. The type of electronic communication devices typically used in the operating environment are telephones, modems, and other electronic communication equipment that connect to a communication medium, such as a telephone line. The thrust of the present invention, however, is to cancel echos resulting from an electrical characteristic mismatch between the near-end hybrid 230 and the far-end hybrid 220 having a transmission medium 225 spanning between them.

Still referring to FIG. 2A, there are three signals: an input signal, x(k), 262, an echo signal, d(k), 264, and a resulting error signal, e(k), 266. The subband adaptive structure 240 estimates a network echo bulk-delay by using x(k) 262, d(k) 264, and e(k) 266 in performing network echo bulk-delay analysis.

Shown in the subband adaptive structure 240 are polyphase analysis banks (PABs) 242a, 242b, 244a, 244b. The PABs 242a, 244a have a single input, receiving a full-band signal x(k) 262 and d(k) 264, respectively, and output a single signal, which is a low pass filtered portion of the respective input signal 262, 264. The PABs 242b, 244b have a single input and dual outputs, from which an upper frequency band and a lower frequency band of the received input are transmitted.

The subband adaptive filters 246 receive signal subbands 252, 254. In the embodiment shown, there are four subbands for x(k) 262 and d(k) 264 presented to the subband adaptive filters 246. If eight subbands of signals x(k) 262 and d(k) 264 are desired, a third layer of four of each PABs 244a, 244b could be added to the subband adaptive structure 240.

Amongst various alternatives for subband division, PS-IIR (power symmetric infinite impulse response) filterbanks are used in the analysis and as synthesis banks. See O. Tanrikulu, B. Baykal, A. G. Constantinides, and J. A. Chambers, "*Residual Echo Signal in Critically Sampled Subband Acoustic Echo Cancellers based on IIR an FIR Filter Banks*", IEEE Trans. Sig. Proc., vol. 45, no. 4, pp. 901–912, April 1997. See also O. Tanrikulu and A. G. Constantinides, "*Cascaded Power Symmetric IIR Filter Banks in Subband Adaptive Filtering with Application to Acoustic Echo Cancellers*",IEEE Trans. Sig. Proc., vol. 46, no. 8, pp. 2220–2225, August 1998.

The motivation for using an IIR filter-bank, in the preferred embodiment, rather than an FIR filter bank is fourfold. First, minimal delay is required to detect the echo bulk-delay. Second, the computational complexity of the proposed filter-bank is minimal. Third, the PS-IIR filterbank requires very low memory. Fourth, the two-band split structure can be used in a binary-tree format repetitively until the desired number of subbands is obtained.

Although an FIR filter-bank is a reasonable substitution for the PS-IIR filter-bank, an oversampled FIR filter-bank is not the preferred embodiment due to its higher computational complexity, delay, and, most important, high memory requirements. See P. A. Naylor and J. E. Hart, "*Subband Acoustic Echo Control using Non-Critical Frequency Sampling*", Proc. of EUSIPCO-96, vol. 2, Trieste, Italy, 1996.

In an embodiment of a PS-IIR filter-bank as a polyphase analysis bank 242, 244 (FIG. 2A), where each phase comprises a cascade of first-order, all-pass sections are given by $$A_i(z^{-1}) = \prod_{j=0}^{P_j-1} \frac{\alpha_{i,j} - z^{-1}}{1 - \alpha_{i,j}z^{-1}} \quad (1).$$

In the above, with suitable $\alpha_{i,j}$ (see O. Tanrikulu and M. Kalkan, "*Design and Discrete Re-Optimization of All-Pass based Power Symmetric IIR Filters*", Electronics Letters, vol. 32, no. 16, pp. 1458–1460, 1996 and P. P. Vaidyanathan, "*Multirate Systems and Filter Banks*", Prentice-Hall, 1993), a low-pass filter may be designed of the form $$H_0(z^{-1}) = \frac{A_0(z^{-2}) + z^{-1}A_1(z^{-2})}{2} \quad (2)$$

A corresponding high-pass filter is given by $H_1(z^{-1})=H_0(-z^{-1})$.

FIG. 3A represents an implementation of a two-band PAB (polyphase analysis bank), as defined by preceding equations (1) and (2). The PAB structure 300 (being representative of 242a,b and 244a,b of FIG. 2A) comprises: a first all-pass section 310, a second all-pass section 320, a first summer 330a, and a second summer 330b.

A PS-IIR filter-bank 300 input 314 receives an input signal. The first all-pass section 310 input 312 receives the input signal. The first all-pass section 310 outputs 322, 326 transmit a product of the input signal and the first all-pass section 310 transfer function to summers 330a and 330b, respectively. Note that a 180 degree phase inversion 326 occurs between the first all-pass section 310 and the summer 330b along transmission path 326.

The second all-pass section 320 input 316 transmits a unity value to the second all-pass section 320. The second all-pass section 320 outputs 324, 328 transmit a product of the unity value and the second all-pass section 320 transfer function to summers 330a and 330b, respectively. Note that there is a unity gain with no phase inversion between the second all-pass section 320 and the summer 330a along path 324.

The summer 330a output 332a transmits a sum of the signals received from the all-pass sections 310, 320 outputs 322 and 324, respectively. The summer 330b output 332b transmits a sum of the signals received from the all-pass section 310, 320 outputs 326, 328, respectively.

Figure 3C:
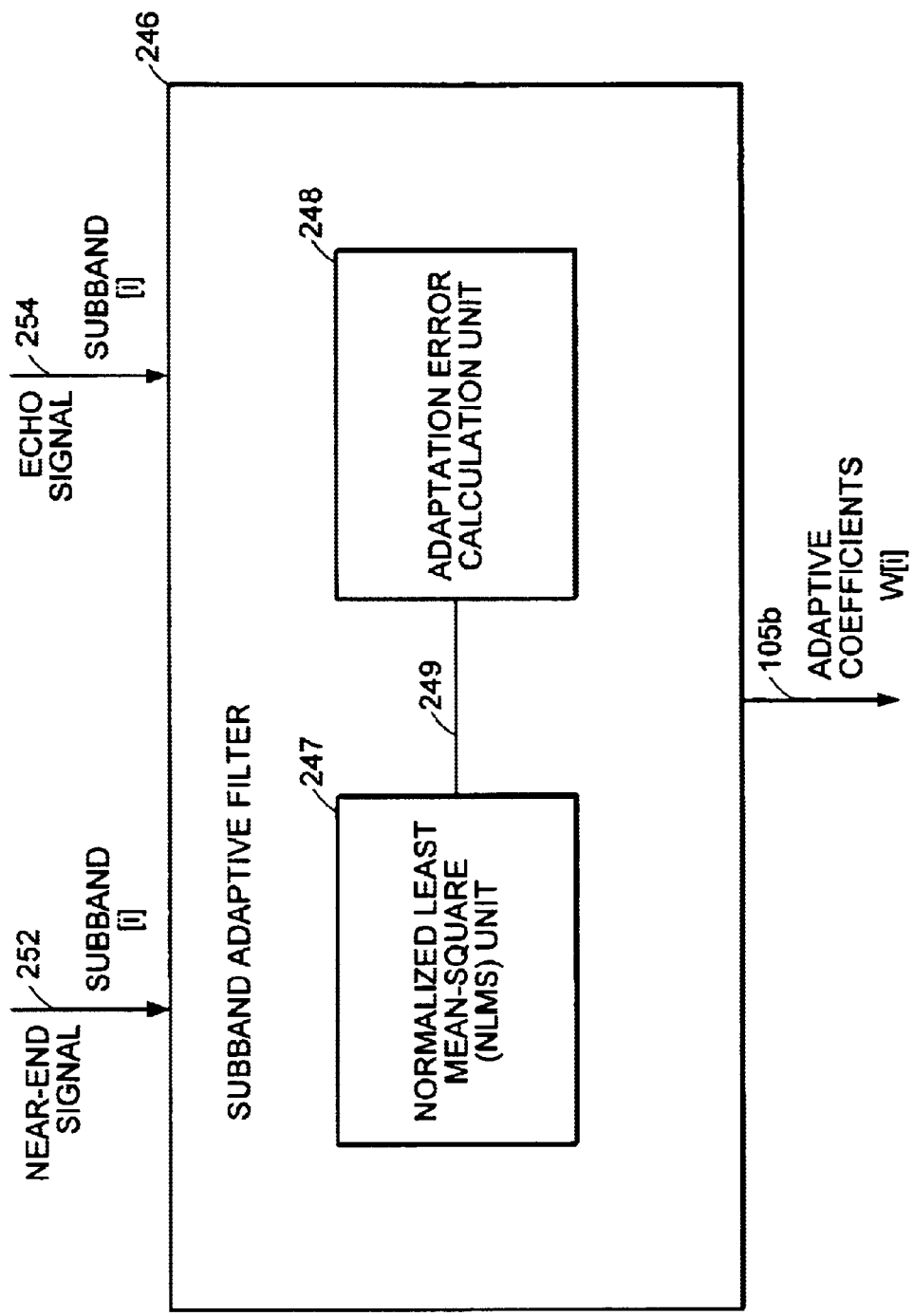
FIG. 3C is a block diagram of an embodiment of an adaptive filter shown in FIG. 3B.

Referring to FIG. 3C, the subband adaptive filter 246 receives a near-end signal 252 and an echo signal 254. The subband adaptive filter 246 transmits a set of adaptive coefficients 105b, which were calculated as a function of the near-end and echo signals 252, 254.

The subband adaptive filters 246 are subband adaptive filters denoted by $W_{[i]}(k) \in R^N$, i=1, ..., B. A set of subband adaptive filter taps are updated using a normalized least mean-square (NLMS) unit 247, in which the following formula is calculated:

$$W_{[i]}(k+1) = W_{[i]}(k) + \frac{\mu e_{[i]}(k)}{\varepsilon + X_{[i]}^T(k)X_{[i]}(k)} X_{[i]}(k) \quad (3),$$

where, $X_{[i]}^T(k)=[x_{[i]}(k)x_{[i]}(k-1) \ldots x_{[i]}(k-N+1)]$ is the input vector corresponding to the near-end signal in the $i^{th}$ subband, $\mu \in (0,2)$ is the step-size, $\varepsilon > 0$ is a safety constant and N is the number of adaptive coefficients in each subband. Note that, for L adaptive coefficients in the full-band, N=[L/B], where the bracket notation (i.e., [ ]) denotes rounding the results of the calculations therein to the nearest integer.

The subband adaptive filters 246 also have a data link 249 from the NLMS unit 247 to an adaptation error calculation unit 248, in which the following equation is calculated:

$$e_{[i]}(k) = d_{i\,[i]}(k) - X_{[i]}^T(k) W_{[i]}(k) \quad (4),$$

where $d_{[i]}(k)$ is the echo signal in the $i_{th}$ subband. The adaptation error calculation unit 248 is an equivalent of a data sampler measuring a signal representing a residual error 256 between the near-end signal subdivided into subbands 252 and the echo signal subdivided into subbands 254.

Figure 1D:
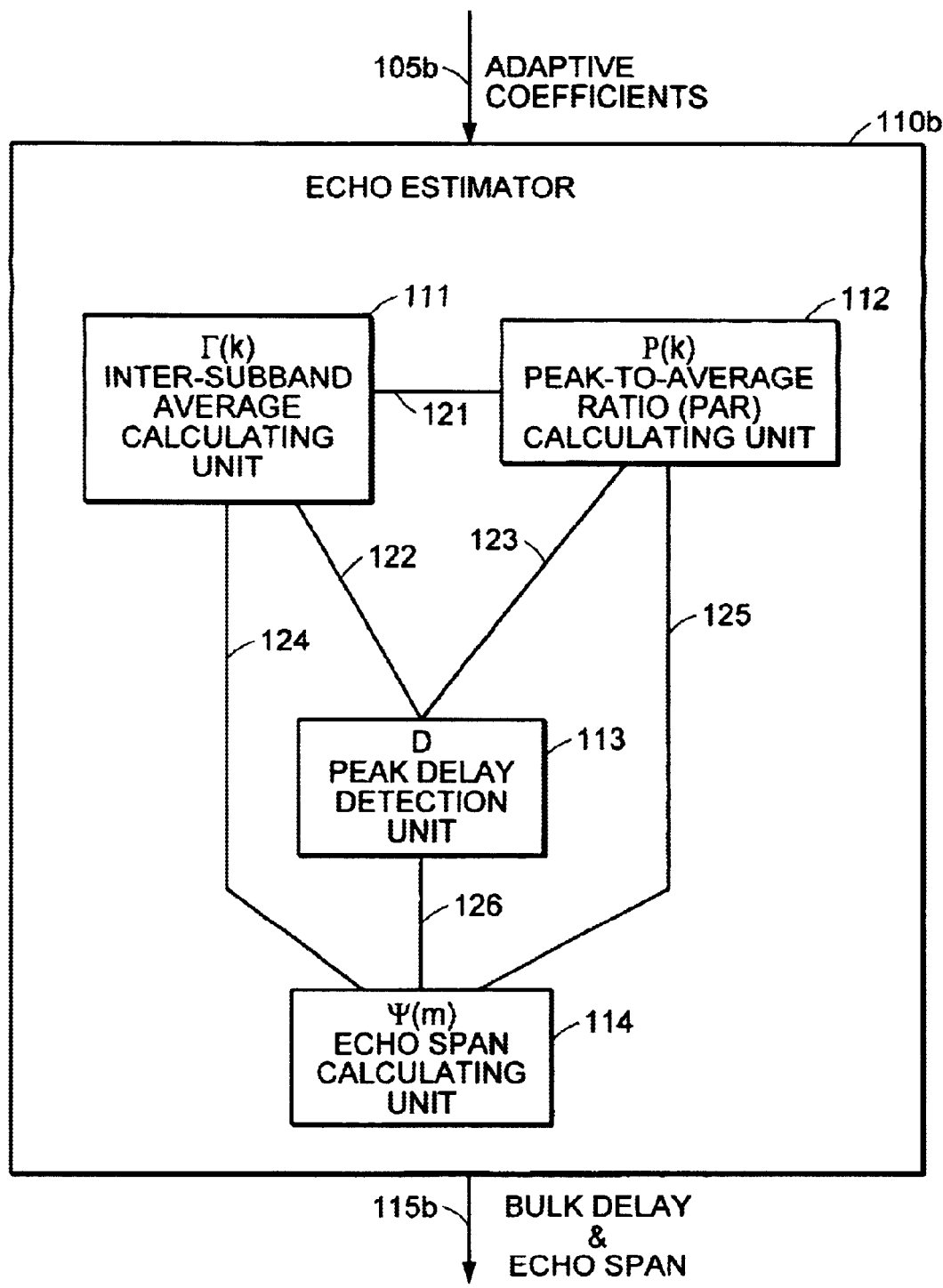
FIG. 1D is a block diagram of an embodiment of the echo estimator shown in FIG. 1B.

Referring to FIGS. 1B and 1D, after the subband adaptive echo canceller 100 is trained on a predefined number of initial frames of data, where a frame of data typically has 1024 sample points or other multiple of 2, an echo estimator 110b receives the adaptive coefficients 105b from the subband adaptive filters 246. In one embodiment, a bulk-delay is calculated as a function of the received adaptive coefficients 105, then transmitted 115b. In the preferred embodiment, the bulk-delay and an echo span are calculated, then transmitted 115b.

According to the teachings of the present invention, the echo estimator 110b (FIG. 1D) has an inter-subband calculating unit 111, a peak-to-average ratio (PAR) calculating unit 112, an peak delay detection unit 113, and an echo span calculating unit 114. A plurality of data links 121, 122, 123, 124, 125, and 126 facilitate information sharing among the forementioned units 111, 112, 113, and 114.

After the subband adaptive echo canceller 100 is trained on a preferred number of initial frames of data, the inter-subband calculating unit 111 computes the following:

$$\Gamma(k) = \frac{1}{B}\sum_{i=1}^{B} |W_{[i]}(k)| \text{ or } \Gamma(k) = \frac{1}{B}\sum_{i=1}^{B} W_{[i]}^2(k) \quad (5),$$

or any other function of the adaptive weights, where $\Gamma^T(k) = [\Gamma(k,1)\Gamma(k,2)\ldots\Gamma(k,N)]$ is the average of the absolute value of subband adaptive filter coefficients 105b averaged across the subbands. The rationale behind these averagings is to reduce the gradient noise while enhancing the response around the echo path impulse response.

During the convergence of $W_{[i]}(k)$, $\Gamma(k)$ will have a strong peak around the peak value of the echo path impulse response. It is important to pick up this peak early, even if it is not highly distinguishable. In the preferred embodiment of the present invention, this is done using the peak-to-average ratio calculating unit 112, which computes the following peak-to-average ratio (PAR) measure:

$$P(k) \stackrel{def}{=} \frac{N \max_j \Gamma(k,j)}{\sum_{j=1}^{N} \Gamma(k,j)} \quad (6).$$

or any other measure that enables the echo bulk delay to be computed.

Note that, $1 << P(k) \leq N$.

The detection of the delay, represented as D, associated with the peak of the echo path impulse response, $D = B \times \check{P}$ is declared when $$\{D : \Gamma(k, \check{P}) = \max_j \Gamma(k, j) P(k) \geq \phi\} \quad (7),$$

where φ is a constant (e.g., 4 or 5). This formula is calculated by the peak delay detection unit 113.

In one embodiment, the echo span calculating unit 114 produces uniformly spaced coefficients across the frequency band. In another embodiment, the echo span calculating unit 114 allocates more coefficients for the echo tail than the coefficients preceding the peak delay when choosing the echo span around the estimated peak delay. This usually gives an acceptable result and will rectify small errors that might have occurred during the estimation of D. In the preferred embodiment of the present invention, the echo span calculating unit 114 computes the following averages:

$$\psi(m) \stackrel{def}{=} \frac{1}{2m+1} \sum_{i=-m}^{m} \Gamma(k, \check{P} - i), \quad (8),$$

and chooses the echo span Ψ(m) as $$\{m : \psi(m) \geq \delta\psi(0)\}, \quad (9),$$

where δ is a small real number, that is usually chosen as 25%.

Figure 2B:
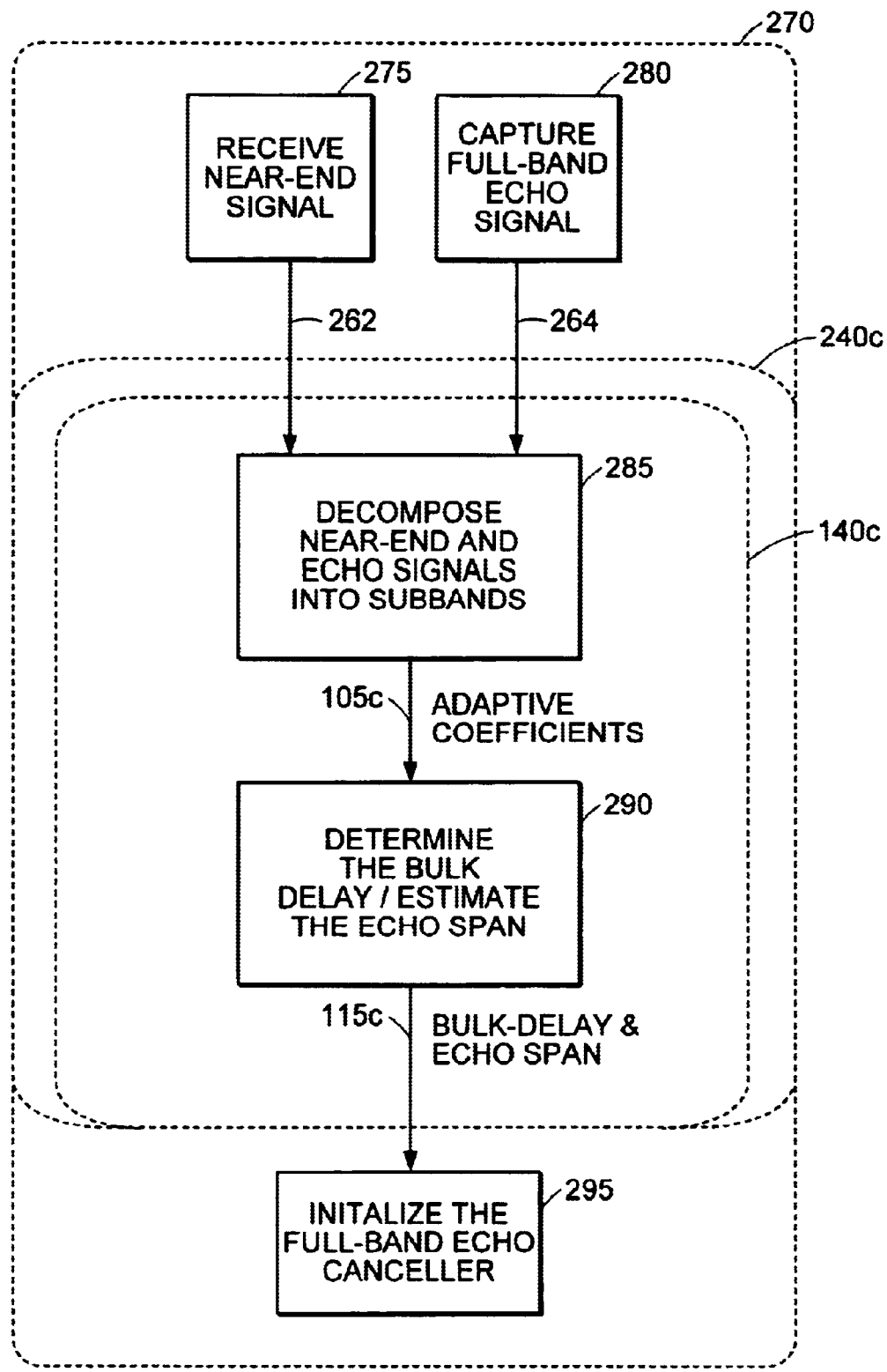
FIG. 2B is a flow diagram of an embodiment of the present invention method, relating to FIG. 2A.

FIG. 2B shows the preferred embodiment of the present invention method on a high level. After receiving the near-end signal in step 275 and capturing the echo signal in step 280, the system method 270 provides the subband and full-band portions 140c, 240c, respectively, of the present invention with the near-end and echo full-band signals in 262, 264.

The near-end and echo signals are decomposed into subbands in step 285. The resulting adaptive coefficients determined are transferred in step 105c to determine the bulk-delay and to estimate the echo span in step 290. A bulk-delay and echo span estimate transfer in step 115c provides an input means for initializing a full-band echo canceller in step 295.

Figure 4:
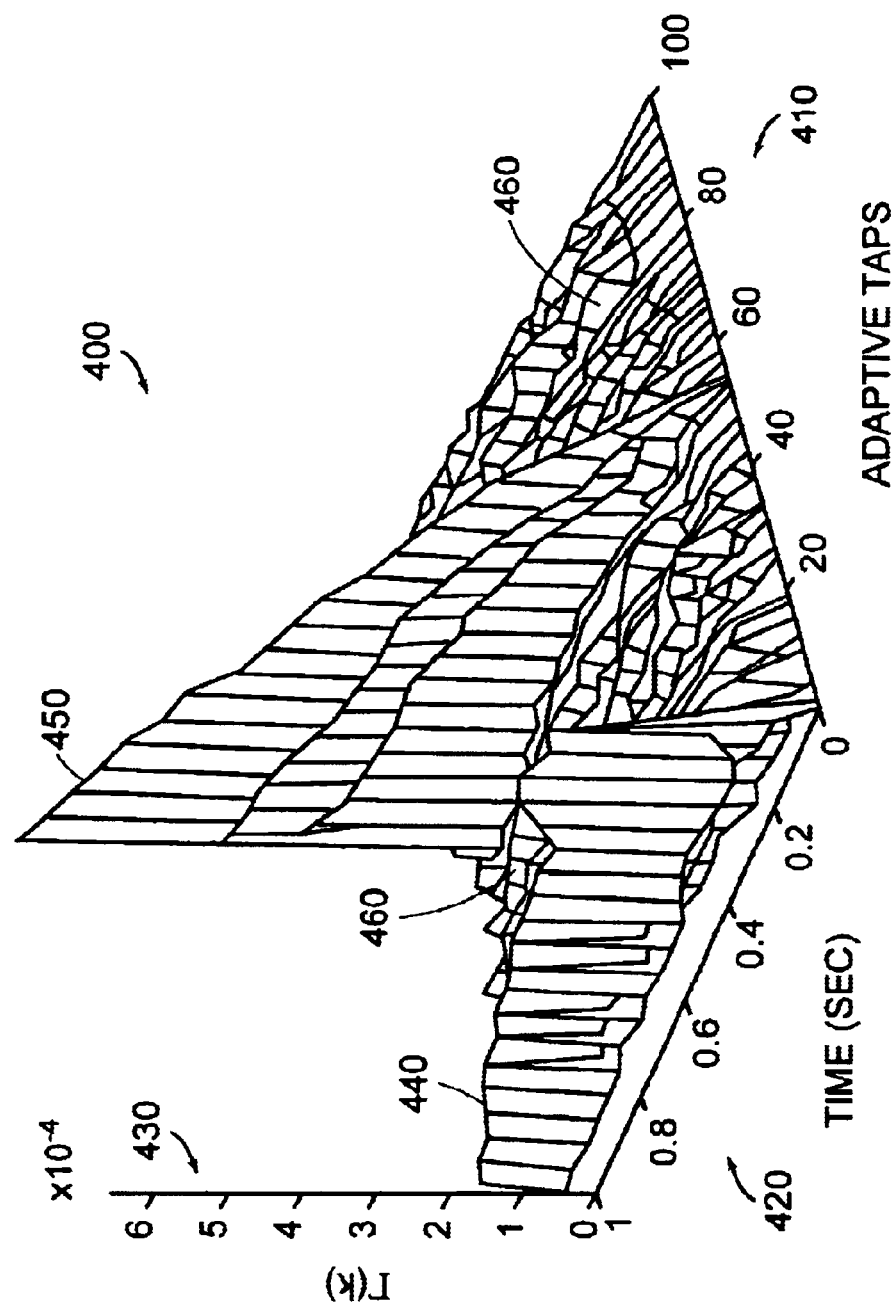
FIG. 4 is a three-dimensional plot produced by an embodiment of FIG. 2A depicting a measure of a set of adaptive taps versus a present invention full-band echo canceller versus time (sec).

FIG. 4 shows a three-dimensional (3-D) plot 400 of a result of a simulation having signals recorded over a typical US telephone connection. The 3-D plot 400 has a time (sec) axis 420, an adaptive taps axis 410, and an inter-subband average Γ(k) axis 430. The effectiveness of using Γ(k) to detect the echo bulk-delay is verified, where it is found that 200–300 msec of training is sufficient to make accurate decisions on the network echo properties.

A decreasing peak around a zero-delay 440 is due to an initial transient in a delay line of the adaptive filters. The peak of the echo path impulse response 450 is estimated to be at 57 msec. A noise floor 460 represents a nominal noise value found on a typical US telephone connection.

Figure 5:
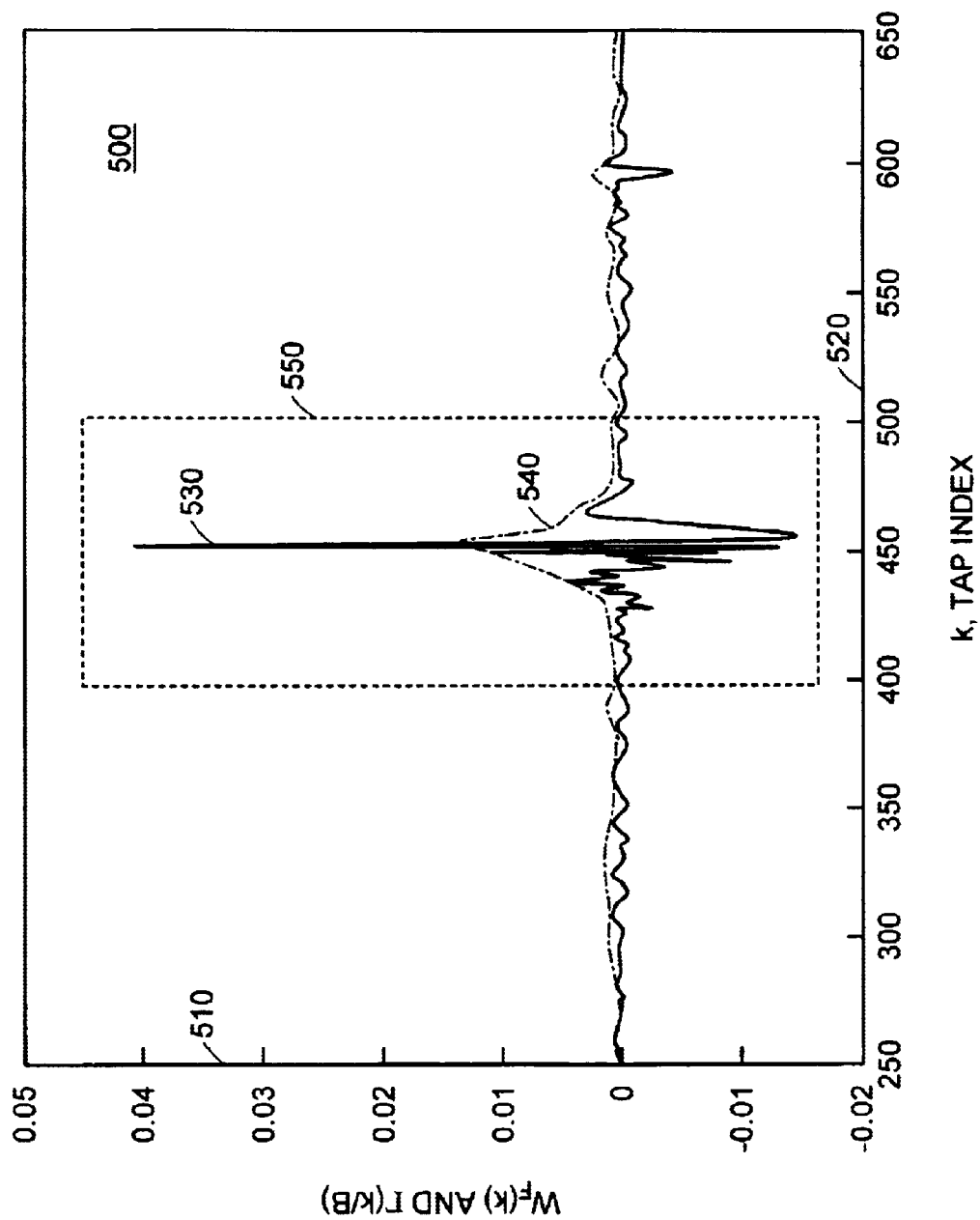
FIG. 5 is a two-dimensional plot produced by an embodiment of FIG. 2A of an estimated full-band echo path impulse response (solid line) and an inter-subband average (dashed line) versus a tap index, k.
Figure 6:
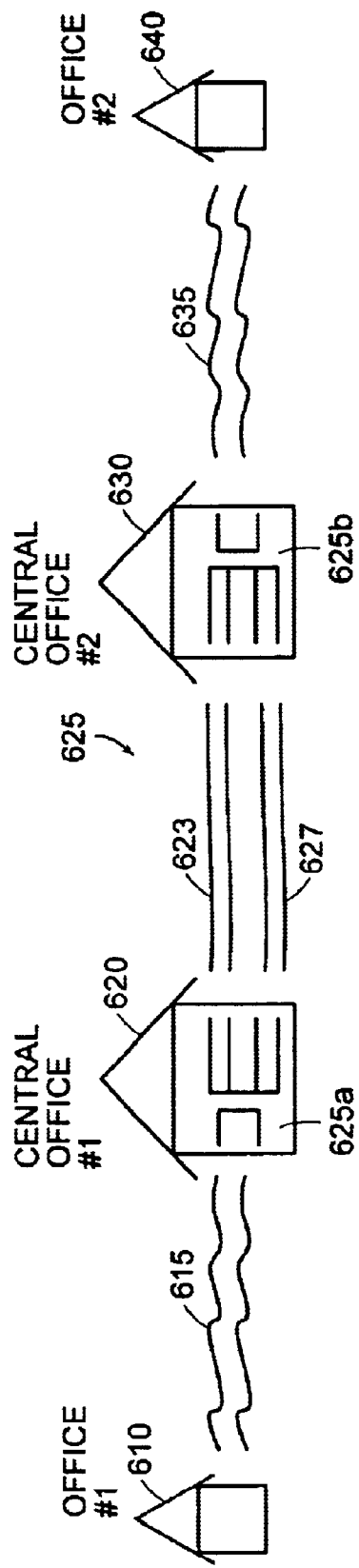
FIG. 6 is an illustration of an example environment in which the present invention of FIG. 2A is deployed.

FIG. 5 is a two-dimensional plot of an estimated full-band echo path impulse response (solid line) and an inter-subband average (dashed line) 510 versus tap index 520. FIG. 5 shows the accuracy of the present invention where the echo path impulse response estimated with a full-band adaptive filter 530, shown as a solid line, and Γ(k) 540, shown as a dashed line, at the instant of peak detection are shown together. Note that the estimation accuracy is limited by a granularity allowed in the subband division. In other words, for an eight-band division, eight consecutive impulse response samples in different subbands are overlaid in calculating Γ(k) 540. Therefore, the accuracy of estimation is 1 msec at an 8 KHz sampling frequency, which is reasonable.

The span of the echo is also estimated from equations (8) and (9), as 104 samples, which agrees with the two-dimensional plot 500.

Finally, the above features are integrated into a G.165 network echo canceller, and it is verified that the requirements in the ITU tests on Echo Return Loss Enhancement (ERLE) and the convergence speed are successfully met. See "*ITU Recommendation*", G.165 cancellers, March, 1993.

While this invention has been particularly shown and described with references to preferred embodiments thereof, it will be understood by those skilled in the art that various changes in form and details may be made therein without departing from the spirit and scope of the invention as defined by the appended claims.

What is claimed:

1. In a telephone line, an echo cancellation apparatus for canceling telephone line transmission echo signals, the echoes comprising an impulse response bulk delay, peak delay, echo span, and echo tail, the telephone lines having a proximal end and a distal end and carrying a proximal signal and an echo signal, the apparatus comprising:

a subband adaptive echo canceller for generating a set of subband adaptive coefficients;

a full-band adaptive echo canceller coupled to the subband adaptive echo canceller for receiving the set of subband adaptive coefficients and initializing a set of full-band coefficients therefrom, said full-band adaptive echo canceller reducing the telephone line transmission signal echoes through use of the full-band adaptive coefficients; and an estimator coupled between the subband echo canceller and full-band echo canceller, the estimator receiving the subband adaptive coefficients and calculating the echo signal bulk delay therefrom, said full-band adaptive echo canceller receiving the calculated echo signal bulk delay and echo span, and in turn refining the set of full-band adaptive coefficients.

2. The apparatus according to claim 1 wherein the estimator further calculates the echo span as a function of the subband adaptive coefficients.

3. The apparatus of claim 1, wherein said subband adaptive echo canceller comprises:

a set of decomposition filters subdividing the proximal and echo signals into corresponding sets of subband proximal signals and subband echo signals, respectively; and a set of subband adaptive filters, responsively calculating the set of subband adaptive coefficients to a received corresponding subband proximal signal and subband echo signal from said set of decomposition filters.

4. The apparatus of claim 3, wherein said decomposition filters are power symmetric infinite impulse response filter banks.

5. The apparatus according to claim 4, wherein said subband adaptive filters comprise a plurality of multiple adaptive coefficients filters and normalized least-mean square unit to update the adaptive coefficients.

6. The apparatus according to claim 5, wherein the normalized least-mean square unit includes the update equation:

$$W_{[i]}(k+1) = W_{[i]}(k) + \frac{ue_{[i]}(k)}{\varepsilon + X_{[i]}^T(k)X_{[i]}(k)} X_{[i]}(k)$$

wherein $$X_{[i]}^T(k) = [x_{[i]}(k)x_{[i]}(k-1) \ldots x_{[i]}(k-N+1)]$$

input vector corresponding to the proximal signal in an $i^{th}$ subband $\mu \epsilon (0,2)$ is a step size, $\epsilon > 0$ is a safety constant, and $N$ is a number of adaptive coefficients in each subband rounded to a nearest integer, and wherein $$e_{[i]}(k) = d_{[i]}(k) - X_{[i]}^T(k)W_{[i]}(k)$$

where $d_{[i]}(k)$ is the echo in the $i^{th}$ subband.

7. The apparatus according to claim 2, wherein said estimator comprises a gradient noise reducing unit.

8. The apparatus according to claim 7, wherein said estimator gradient noise reducing unit receives the sets of subband adaptive filter coefficients and calculates an average according to the equation:

$$\Gamma(k) = \frac{1}{B}\sum_{i=1}^{N} |W_{[i]}(k)|.$$

9. The apparatus according to claim 7, wherein said estimator gradient noise reducing unit receives the sets of subband adaptive filter coefficients and calculates an average according to the equation:

$$\Gamma(k) = \frac{1}{B}\sum_{i=1}^{N} W_{[i]}^2(k).$$

10. The apparatus according to claim 8, wherein the estimator further comprises an echo path impulse response peak detector, wherein the peak of the echo signal being canceled is located.

11. The apparatus according to claim 10, wherein the echo path impulse response peak detector comprises:

a peak to average ratio measuring unit; and a peak to average ratio threshold detector.

12. The apparatus according to claim 10, wherein the peak to average ratio measuring unit computes a peak to average ratio measure according to the equation:

$$P(k) \stackrel{\text{def}}{=} \frac{{}^{N}\max_j \Gamma(k,j)}{\sum_{j=1}^{N}\Gamma(k,j)}.$$

13. The apparatus according to claim 11, wherein the estimator further comprises an echo span calculation unit.

14. The apparatus according to claim 13, wherein said echo span calculation unit allocates more coefficients to the echo tail than to the echo signal preceding the peak delay.

15. The apparatus according to claim 13, wherein the echo span calculation unit further comprises:

an echo span averaging unit having the following formula:

$$\psi(m) \stackrel{\text{def}}{=} \frac{1}{2m+1}\sum_{i=-m}^{m}\Gamma(k, \breve{P} - i),$$

and, in response, the echo span is chosen according to the following formula:

$$\{m: \psi(m) \geq \delta\psi(0)\},$$

where $\delta$ is a small real number that is usually chosen as 25%.

16. In an echo canceller in a telephone line, an estimator apparatus for estimating an echo signal on a telephone line carrying a proximal signal and an echo signal, the echo signal having a bulk delay and an echo span, the estimator apparatus comprising:

a subband adaptive echo canceller including a set of subband adaptive coefficients responsively adjustable to the echo signal and outputting the set of subband adaptive coefficients after achieving a reasonable level of convergence; and an estimator coupled to the adaptive echo canceller and determining the echo signal bulk delay as a function of the subband adaptive coefficients.

17. The apparatus according to claim 16, wherein said subband adaptive echo canceller comprises:

a set of subband decomposition filters decomposing the proximal and echo signals into corresponding sets of subband proximal signals and subband echo signals; and a set of adaptive filters coupled to the decomposition filters, said adaptive filters receiving the sets of subband proximal signals and subband echo signals and adjusting the set of subband adaptive coefficients in response thereto.

18. The apparatus according to claim 16 wherein the estimator further determines the echo span as a function of the subband adaptive coefficients.

19. The apparatus according to claim 18, wherein said subband adaptive echo canceller comprises:

a set of subband decomposition filters decomposing the proximal and echo signals into corresponding sets of subband proximal signals and subband echo signals; and a set of adaptive filters coupled to decomposition filters, for receiving the sets of subband proximal signals and subband echo signals and adjusting the set of subband adaptive coefficients in response thereto.

20. The apparatus of claim 19, wherein said decomposition filters are power symmetric infinite impulse response filter banks.

21. The apparatus according to claim 18, wherein said subband adaptive filters comprise a normalized least-mean square unit to update the adaptive coefficients.

22. The apparatus according to claim 19, wherein the normalized least-mean square unit includes the update equation:

$$W_{[i]}(k+1) = W_{[i]}(k) + \frac{ue_i(k)}{\varepsilon + X_{[i]}^T(k)X_{[i]}(k)} X_{[i]}(k)$$

wherein $$X_{[i]}^T(k) = [x_{[i]}(k)x_{[i]}(k-1) \ldots x_{[i]}(k-N+1)]$$

is an input vector corresponding to the proximal signal in an $i_{th}$ subband, $\mu\epsilon(0,2)$ is a step size, $\epsilon>0$ is a safety constant, and N is a number of adaptive coefficients in each subband rounded to the nearest integer to a nearest integer.

23. The apparatus according to claim 17, wherein said estimator comprises a gradient noise reducing unit.

24. The apparatus according to claim 21, wherein said estimator gradient noise reducing unit receives the sets of subband adaptive filter coefficients and calculates an average according to the equation:

$$\Gamma(k) = \frac{1}{B} \sum_{i=1}^{B} |W_{[i]}(k)|.$$

25. The apparatus according to claim 23, wherein said estimator gradient noise reducing unit receives the sets of subband adaptive filter coefficients and calculates an average according to the equation:

$$\Gamma(k) = \frac{1}{B} \sum_{i=1}^{N} W_{[i]}^2(k).$$

26. The apparatus according to claim 24, wherein the estimator further comprises an echo path impulse response peak detector, wherein the peak of the echo signal being canceled is located.

27. The apparatus according to claim 26, wherein the echo path impulse response peak detector comprises:

a peak to average ratio measuring unit; and a peak to average ratio threshold detector.

28. The apparatus according to claim 27, wherein the peak to average ratio measuring unit computes a peak to average ratio measure according to the equation:

$$P(k) \stackrel{\text{def}}{=} \frac{N \max_j \Gamma(k, j)}{\sum_{j=1}^{N} \Gamma(k, j)}.$$

29. The apparatus according to claim 27, wherein the estimator further comprises an echo span calculation unit.

30. The apparatus according to claim 29, wherein said echo span calculation unit allocates more coefficients to the echo tail than to the echo signal preceding the peak delay.

31. The apparatus according to claim 29, wherein the echo span calculation unit further comprises:

an echo span averaging unit having the following formula:

$$\psi(m) \stackrel{\text{def}}{=} \frac{1}{2m+1} \sum_{i=-m}^{m} \Gamma(k, \check{P}-i),$$

and, in response, the echo span is chosen according to the following formula:

$$\{m : \psi(m) \geq \delta\psi(0)\},$$

where $\delta$ is a small real number that is usually chosen as 25%.

32. In an echo canceller in a telephone line, a method for reducing an echo signal in a path with an echo path impulse response having a bulk delay, peak delay, echo span, and echo tail in a telephone network carrying a proximal signal and an echo signal, the method comprising:

determining subband adaptive coefficients as a function of the proximal signal and the echo signal;

calculating the bulk delay as function of the subband adaptive coefficients; and using the bulk delay to reduce the echo signal due to the echo path impulse response.

33. The method according to claim 32 further comprising: calculating the echo span as a function of the subband adaptive coefficients.

34. The method according to claim 32 further comprising:

calculating the echo span as a function of the adaptive coefficients; and using the echo span to reduce the echo signal due to echo path impulse response.

35. The method of claim 32, wherein determining the adaptive coefficients comprises:

subdividing the proximal signal and the echo signal into sets of subbands; and processing the subdivided proximal signal and the subdivided echo signal, to determine the adaptive coefficients.

36. The method of claim 35, wherein subdividing the proximal signal and the echo signal comprises the step of power symmetric infinite impulse response filtering.

37. The method of claim 35, wherein the step of processing comprises subband adaptive filtering corresponding subband proximal and echo signals, wherein a subband adaptive filter used to perform the step of subband adaptive filtering comprises a plurality of adaptive coefficients.

38. The method according to claim 37, wherein subband adaptive filtering comprises the step of minimizing a normalized least mean-square of the echo signals in each subband.

39. The method of claim 38, wherein the step of calculating the bulk delay comprises reducing gradient noise while enhancing the response around the echo path impulse response.

40. The method of claim 39, wherein the step of reducing gradient noise while enhancing the response around the echo path impulse response comprises calculating an average according to the equation:

$$\Gamma(k) = \frac{1}{B}\sum_{i=1}^{B} |W_{[i]}(k)|.$$

41. The method of claim 39, wherein the step of reducing gradient noise while enhancing the response around the echo path impulse response comprises calculating an average according to the equation:

$$\Gamma(k) = \frac{1}{B}\sum_{i=1}^{N} W_{[i]}^2(k).$$

42. The method according to claim 40, wherein calculating the bulk delay further comprises detecting the echo path impulse response peak delay.

43. The method according to claim 42, wherein detecting the delay associated with the peak of the echo path impulse response comprises:

calculating a peak to average ratio; and determining whether the peak to average ratio exceeds a pre-determined peak to average ratio threshold.

44. The method according to claim 43, wherein calculating the peak to average ratio includes processing data according to the equation:

$$P(k) \stackrel{\text{def}}{=} \frac{{}^N\max_j \Gamma(k,j)}{\sum_{j=1}^{N} \Gamma(k,j)}.$$

45. The method according to claim 36, wherein calculating the echo span comprises allocating more adaptive coefficients for the echo tail than adaptive coefficients preceding the peak delay.

46. The method according to claim 43, wherein calculating the echo span comprises:

averaging the echo span around the estimated peak delay according to the following formula:

$$\psi(m) \stackrel{\text{def}}{=} \frac{1}{2m+1}\sum_{i=-m}^{m} \Gamma(k, \tilde{P}-i), ; \text{ and}$$

choosing the echo span according to the following relationship:

$$\{m : \psi(m) \geq \delta\psi(0)\},$$

where δ is a small real number that is usually chosen as 25%.

47. The method according to claim 37, wherein using the adaptive coefficients to reduce the undesired echo path impulse response comprises outputting the subband adaptive filter coefficients to a full-band echo canceller.

* * * * *